United States Patent [19]

Kamman

[11] Patent Number: 5,373,917
[45] Date of Patent: Dec. 20, 1994

[54] WHEEL BRAKE MECHANISM
[75] Inventor: Gordon W. Kamman, Elma, N.Y.
[73] Assignee: Fisher-Price, Inc., East Aurora, N.Y.
[21] Appl. No.: 232,484
[22] Filed: Aug. 15, 1988
[51] Int. Cl.$^5$ .............................................. B60B 33/00
[52] U.S. Cl. ..................... 188/1.12; 188/19; 188/72.8; 188/72.9
[58] Field of Search ................ 188/1.12, 19, 20, 31, 188/2 F, 69, 265, 72.7, 72.8, 72.9, 73.41; 280/87.11

[56] References Cited

U.S. PATENT DOCUMENTS

| | | | |
|---|---|---|---|
| 352,689 | 11/1886 | Haus | 188/20 |
| 1,671,774 | 5/1928 | McIntosh | 188/69 X |
| 3,690,415 | 9/1972 | Nordskog | 188/31 X |

FOREIGN PATENT DOCUMENTS

| | | | |
|---|---|---|---|
| 426429 | 4/1935 | United Kingdom | 188/20 |

*Primary Examiner*—Robert J. Oberleitner
*Assistant Examiner*—Josie A. Ballato
*Attorney, Agent, or Firm*—Howrey & Simon

[57] ABSTRACT

A wheel brake mechanism is disclosed for a vehicle such as a carriage or stroller having a wheel mounted on an axle. The wheel is of the normal type having radially extending ribs with spaces or recesses therebetween. The brake housing is mounted for pivotal movement around the axle between a normal unbraking position and a braking position by depressing a foot pedal attached to the housing. The brake mechanism comprises a cam mounted within the brake housing, and a cam follower mounted on the vehicle body. The cam follower has a cam engagable portion and a wheel engaging portion. Pivotal movement of the brake housing to its braking position causes the cam to force the wheel engaging portion into a wheel recess for braking the wheel.

10 Claims, 3 Drawing Sheets

WHEEL BRAKE MECHANISM

BACKGROUND OF THE INVENTION

1. Field of the Invention

The present invention relates generally to brake mechanisms, and more particularly to a wheel brake mechanism in which a wheel engaging portion thereof is inserted into a recess in the wheel.

2. Description of the Prior Art

It is known in the art to provide a wheel brake mechanism for a vehicle having a brake housing pivotally mounted on the body for pivotal movement between a normal unbraking position and a braking position. Movement of the brake housing to its braking position causes a cam in the housing to force a wheel engaging portion of a cam follower into a space or recess between the spokes of the wheel.

A disadvantage of the known wheel brake mechanism is that it does not operate reliably in those applications in which the brake housing is mounted for pivotal movement around the axle, and a portion of the brake mechanism is mounted on the body and relative movement exists between the axle and body. The unreliability of the wheel brake mechanism results largely from misalignment of the cam and cam follower, due primarily to the relative motion that occurs between the axle and body. The wheel brake mechanism in accordance with the present invention is believed to overcome this and other disadvantages of the prior known wheel brake mechanism.

SUMMARY OF THE INVENTION

An object of the present invention is to provide a brake mechanism for a vehicle having a wheel mounted on an axle and having a brake housing mounted for pivotal movement around the axle between a normal unbraking position and a braking position. A brake means is provided comprising a cam mounted within the brake housing and a cam follower mounted on the vehicle body. The cam follower has a cam engageable portion and a wheel engaging portion. Pivotal movement of the brake housing to its braking position causes the cam to force the wheel engaging portion into a recess in the wheel for braking the wheel.

Another object of the invention is to provide a braking mechanism wherein the cam engageable portion is mounted within the housing and comprises a rounded end portion, and the cam comprises an arcuate sloping channel.

Still another object of the invention is to provide a brake mechanism wherein the brake housing has a foot operated handle. The cam follower of the brake mechanism comprises a pin reciprocally mounted within the vehicle body and having a cam engageable portion at one end of the pin. The cam engageable portion further has a circular skirt adjacent the rounded end portion. A spring encircles the pin for biasing the skirt and rounded end portion toward the arcuate sloping channel.

Yet another object of the invention is to provide a brake mechanism wherein means are interposed between the axle and body for allowing relative movement therebetween.

Still another object of the invention is to provide a brake mechanism wherein the axle has a wheel mounted at each end thereof, and a sleeve is provided encircling the axle for rotation around the axle. A brake housing is secured to each end of the sleeve such that pivotal movement of one of the brake housings to its braking position automatically moves the other brake housing to its braking position.

BRIEF DESCRIPTION OF THE DRAWINGS

In the detailed description of the invention presented below, reference is made to the accompanying drawings, in which.

DETAILED DESCRIPTION OF THE INVENTION

Because wheel brake mechanisms are known in the art, the present description will be directed in particular to elements forming part of, or cooperating directly with, a wheel brake mechanism in accordance with the present invention. It is to be understood that elements not specifically shown or described may take various forms well-known to those skilled in the art.

Figure 1:
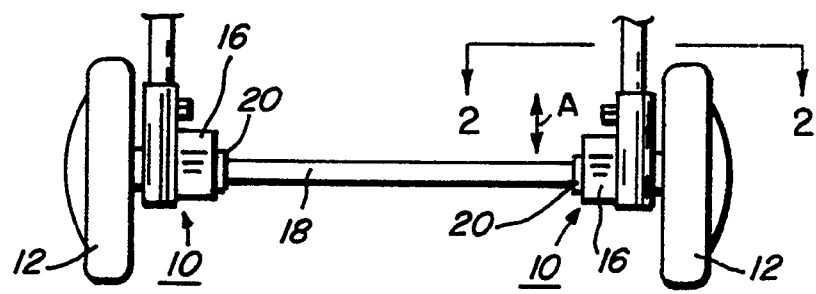
FIG. 1 is a segmental side rear elevational view of a vehicle in which a wheel brake mechanism in accordance with the present invention is provided for each wheel.
Figure 2:
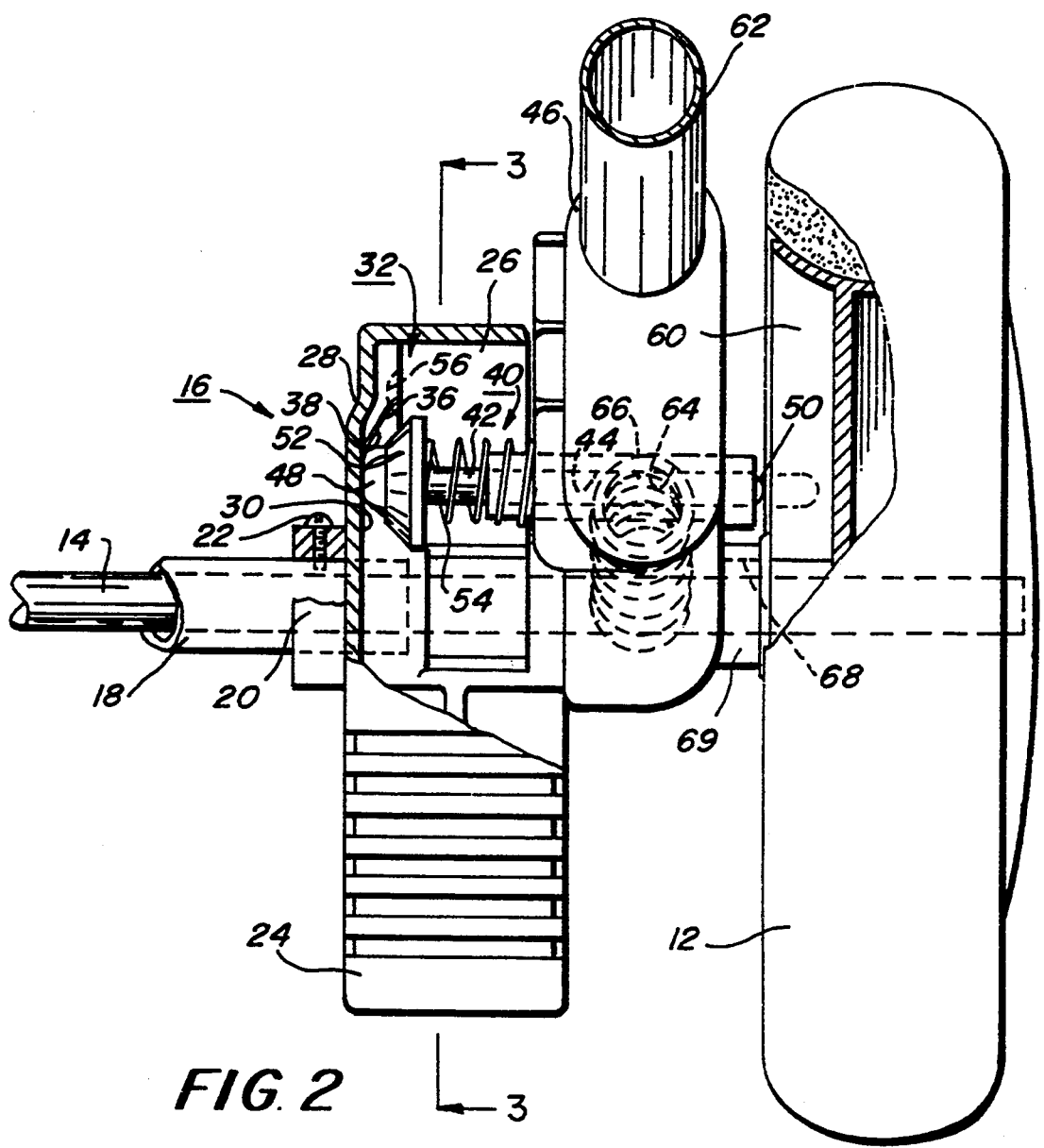
FIG. 2 is an enlarged top elevational view taken substantially along line 2—2 of FIG. 1.
Figure 3:
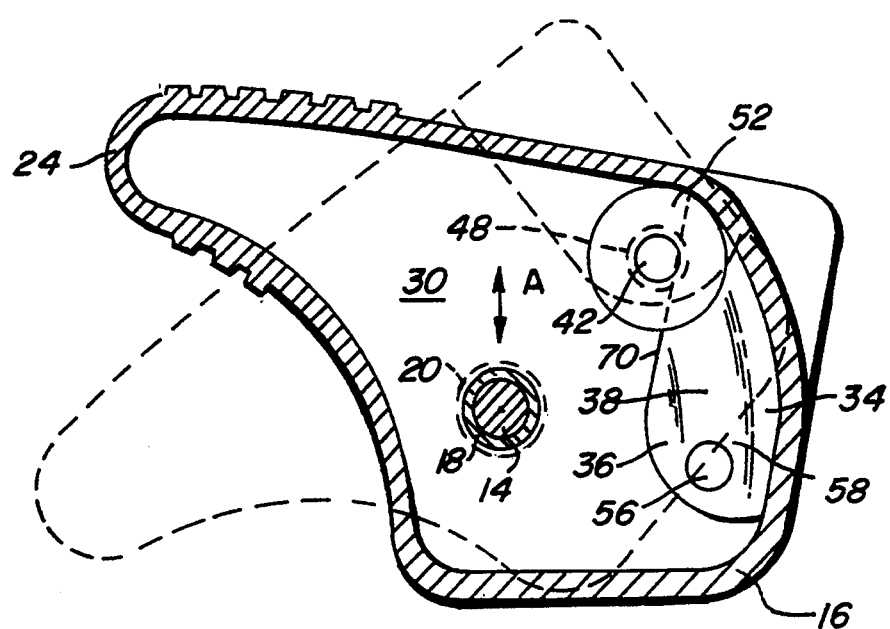
FIG. 3 is a section view taken substantially along line 3—3 of FIG. 2.

With reference to FIGS. 1-3, a preferred embodiment of a wheel brake mechanism 10 in accordance with the present invention is shown for use in any vehicle having a spoked wheel 12 mounted on an axle 14. The vehicle can be of any type such as a baby stroller or carriage, for example.

Since the wheel brake mechanisms 10 adjacent each wheel 12 in FIG. 1 are substantially identical, the only difference being that one is a mirror image of the other, only one of the wheel brake mechanisms will be disclosed in detail. The wheel brake mechanism comprises a brake member such as a brake housing 16, a sleeve 18 encircling the axle 14, and a collar 20 on brake housing 16 for optionally securing the housing to one end of sleeve 18 by a screw 22 or the like to couple the two brake mechanisms. The housing has a foot pedal 24, as best seen in FIG. 3, which when depressed into the dotted position imparts pivotal movement to brake housing 16, and to the other brake housing via sleeve 18.

The brake mechanisms on wheels 12 may be decoupled so that they act independently by eliminating the connection between one or both of the brake mechanisms and sleeve 18. This allows the two brake levers to be operated independently and provides a degree of redundancy in case of, for example, one brake lever being accidently released. In accordance with an embodiment of this invention having independently operable brake levers, sleeve 18 acts primarily as a spacer between the two brake levers to maintain them in position.

The brake housing 16 has a cavity 26 and a side wall 28 having an inner surface 30 onto which a cam 32 is mounted. The cam comprises an arcuate ramp having spaced-apart upwardly sloping surfaces 34, 36 to form an arcuate sloping channel 38 for guiding a cam follower 40 mounted on a mounting block 46 on the vehicle body. The cam follower comprises a cylindrical pin 42 mounted for reciprocal movement within a cylindrical opening 44 extending through mounting block 46 on the vehicle body. The cam follower has a cam engageable rounded end portion 48 at one end, and a tapered small radius engaging portion 50 at the opposite end. A circular skirt portion 52 is mounted on the pin 42 adjacent rounded end portion 48, and a helical spring 54 encircles pin 42 and has one end thereof bearing on block 46 to force rounded end portion 48 against inner surface 30 of side wall 28. Accordingly, when foot pedal 24 is depressed by an operator, rounded end portion 48 engages arcuate sloping channel 38 and is cammed axially to the right in FIG. 2 as the rounded end portion climbs up the channel and bottoms into a circular notch 56 when the rounded end portion reaches a flat surface 58 at the end of the channel within which the notch is located. The rounded end portion 48 bottoms in notch 56 for releasably holding brake housing 16 in a braking position. In this position, the sharp tip 50 of pin 42 is inserted between a pair of radially extending spokes on the wheel in the form a plurality of thin flat radially extending and angularly spaced ribs 60, only one of which is seen in FIG. 2. The tip 50 is tapered to a small radius preferably spherical end and the ribs 60 are thin to minimize the likelihood of the tip engaging and hanging up on a rib.

The vehicle body comprises a wheel support tube 62 having an end thereof secured to body mounting block 46. The block is provided with an elongated inner blind bore 64, within which a helical spring 66 is mounted, having one end thereof bearing against axle 14 for forcing the axle against one end of an elongated opening 68 in boss 69. Accordingly, wheel axle 14, sleeve 18 and brake housing 16, are slidably movable as a unit in the direction of arrows A relative to mounting block 46. Such movement may cause relative motion displacement between cam 32 which is mounted on housing 16 and cam follower 40, which is mounted on mounting block 46. This relative motion is accommodated by providing arcuate sloping channel 38 with a substantially wide entry mouth 70, and circular skirt 52 which guides rounded end portion 48 into and along the sloping channel.

Figure 4:
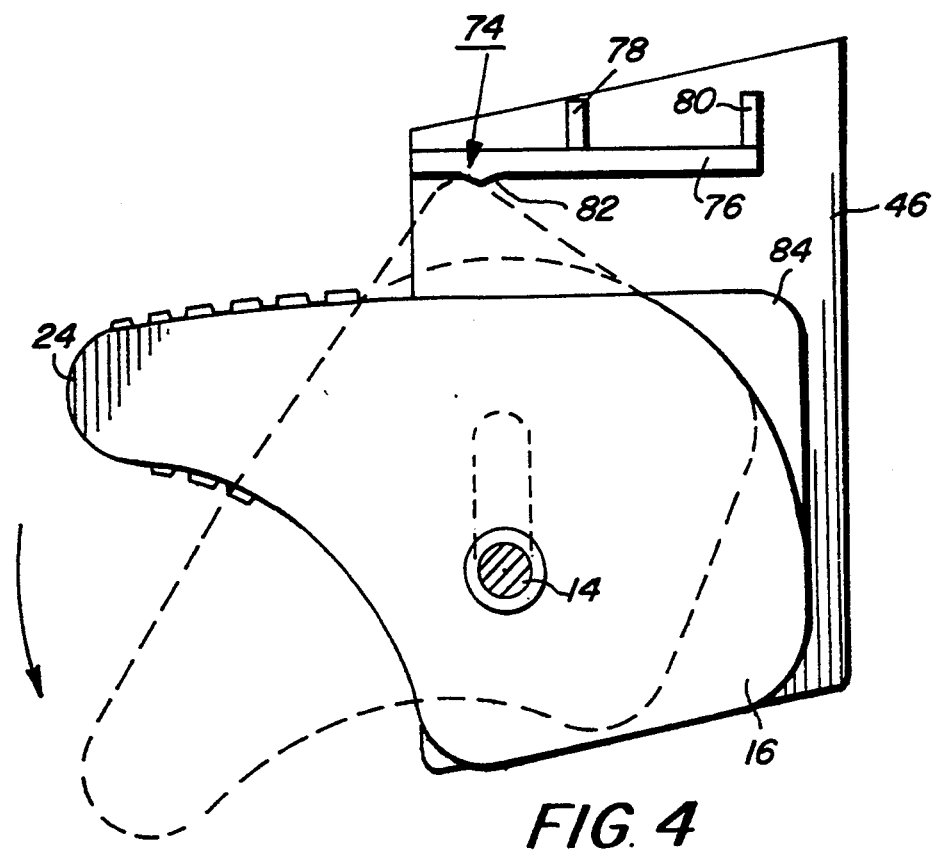
FIG. 4 is a side view of the wheel brake mechanism.
Figure 5:
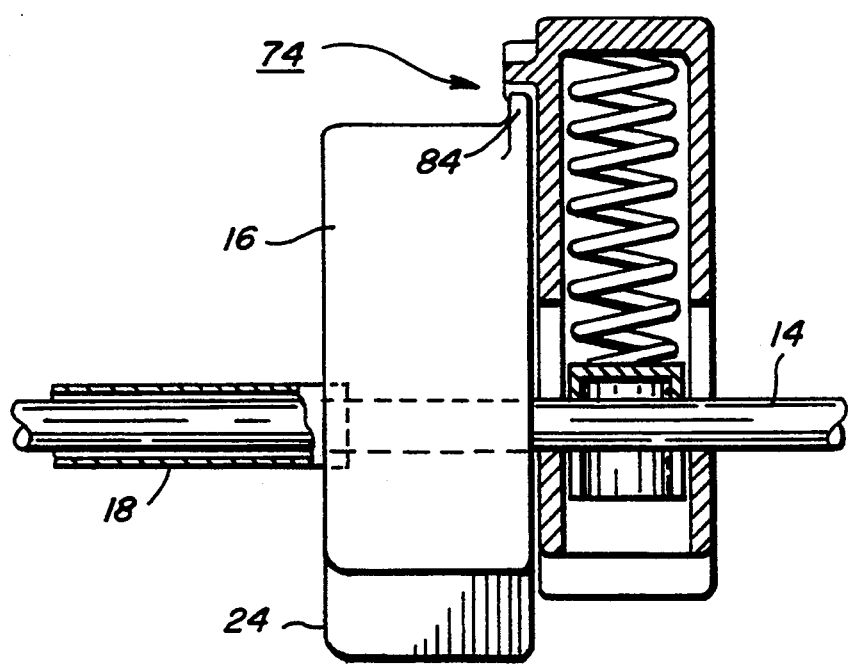
FIG. 5 is a rear, partially sectional, view of the wheel brake mechanism.

In accordance with the preferred embodiment of this invention shown in FIGS. 1–3, an auxiliary locking detent 74 may be provided, as best shown in FIGS. 4 and 5. A detent supporting web 76 extends outwardly from block 46 of the vehicle body. First and second generally triangular supporting webs 78 and 80 reinforce web 76. A downwardly extending projection 82 resiliently engages the peripheral surface of an outwardly extending web 84 located substantially at the corner of brake housing 16.

The resilient interengagement of projection 82 and web 84 locks the brake housing in its brake engaged position and disables the axle suspension as can be most clearly seen in FIG. 5.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the spirit and scope of the appended claims.

What is claimed is:

1. A wheel brake for a vehicle having an axle mounted to a vehicle body and a wheel mounted to rotate about the axle, with the axle being oriented along a first axis and the wheel having ribs defining angularly spaced recesses, said wheel brake comprising:
   a brake member mounted for pivotal rotation between an unbraking position and a braking position, about a second axis substantially parallel to the first axis;
   a cam surface mounted on said brake member: and
   a cam follower having a cam surface contacting portion and a wheel engaging portion, said cam follower mounted for translational movement between a wheel non-engaging position and a wheel-engaging position along a first movement direction substantially parallel to the first axis,
   wherein rotation of said brake member from the unbraking position to the braking position causes said cam surface to urge said cam follower along the movement direction to the wheel engaging position where said wheel engaging portion engages one of the recesses to brake the wheel.

2. A wheel brake according to claim 1, further comprising means for biasing said cam follower towards said cam surface.

3. A wheel brake according to claim 1, wherein said brake member is mounted on the axle for rotation about the axle.

4. A wheel brake according to claim 1, wherein said brake member houses said cam surface contactable portion.

5. A wheel brake according to claim 1, wherein said cam follower is mounted on the vehicle body for translational movement in the first movement direction.

6. A wheel brake according to claim 1, wherein said cam surface defines an arcuate sloping channel.

7. A wheel brake according to claim 6, wherein said cam surface has a notch portion, and said cam engaging portion rests in said notch when said brake member is in the braking position to releasably retain said brake member in the braking position.

8. A wheel brake according to claim 6, wherein said brake member is mounted on the axle for rotation about the axle, said cam follower is mounted on the vehicle body for translational movement in the movement direction, and said vehicle body is mounted to said axle for relative movement with respect to said axle along a second movement direction substantially perpendicular to the first axis.

9. A wheel brake according to claim 1, further comprising:
   a projection extending frown said brake member; and
   a detent provided on said vehicle body, said detent being engaged by said projection when said brake member is in the braking position to releasably retain said brake member in the braking position.

10. A wheel brake system for a vehicle having a vehicle body with an axle having two ends mounted thereto, and having first and second wheels each mounted at one end of the axle to rotate about the axle, with the axle being oriented along a first axis and the wheels each having ribs defining angularly spaced recesses, said wheel brake system comprising:
   first and second brake members, each mounted for pivotal rotation between an unbraking rotation and a braking position, about a second axis substantially parallel to the first axis:
   a first cam surface mounted to said first brake body;
   a second cam surface mounted to said second brake body;

a first cam follower having a first cam surface contacting portion and a first wheel engaging portion, said first cam follower mounted for movement between a first wheel non-engaging position and a first wheel engaging position along a first movement direction substantially parallel to the first axis;

a second cam follower having a second cam surface contacting portion and a second wheel engaging portion, said second cam follower mounted for movement between a second wheel non-engaging portion and a second wheel-engaging position along a second movement direction substantially parallel to the first axis; and a coupling member for coupling said first and second brake members so that rotation of one said brake member to the braking position rotates the other said brake member to the braking position, wherein rotation of said brake members to the braking position causes said first and second cam surfaces to urge said first and second cam followers to the first and second wheel engaging positions, respectively, so that said first and second wheel engaging portions each engage respective recesses to brake the wheels.

* * * * *